United States Patent
Green

(10) Patent No.: US 6,501,962 B1
(45) Date of Patent: Dec. 31, 2002

(54) MOBILE COMMUNICATIONS TERMINAL SMART CARD

(75) Inventor: Mark Green, North Somerset (GB)

(73) Assignee: Orange Personal Communications Services Limited, Bristol (GB)

( * ) Notice: Subject to any disclaimer, the term of this patent is extended or adjusted under 35 U.S.C. 154(b) by 0 days.

(21) Appl. No.: 09/269,133

(22) PCT Filed: Jan. 31, 1997

(86) PCT No.: PCT/GB97/00289

§ 371 (c)(1),
(2), (4) Date: Mar. 12, 1999

(87) PCT Pub. No.: WO98/11746

PCT Pub. Date: Mar. 19, 1998

(30) Foreign Application Priority Data

Sep. 13, 1996 (GB) .............................................. 9619159

(51) Int. Cl.⁷ ................................................. H04Q 7/04
(52) U.S. Cl. ...................... 455/558; 455/186.1; 455/564
(58) Field of Search .................... 455/550, 551, 455/556, 557, 558, 186.1, 186.2, 412, 564, 566; 235/380, 382, 387.5; 379/102.06, 142, 144, 149, 357

(56) References Cited

U.S. PATENT DOCUMENTS 4,875,230 A   10/1989   Blair
5,687,216 A * 11/1997   Svensson ..................... 455/412
5,809,125 A *  9/1998   Gammino .................... 379/199
6,012,634 A *  1/2000   Brogan et al. .............. 455/558

FOREIGN PATENT DOCUMENTS

| EP | 0 614 303 A1 | 9/1994 |
| GB | 2 251 357 A | 7/1992 |
| GB | 2 270 442 A | 3/1994 |

OTHER PUBLICATIONS

Smart Card Technology Applied to the Future European Cellular Telephone on the digital D–Network, A. J. Farrugia and P. Peyret, 1991 Elsevier Science Publishers B.V.

* cited by examiner

*Primary Examiner*—Lester G. Kincaid
(74) *Attorney, Agent, or Firm*—Knobbe, Martens, Olson & Bear, LLP

(57) ABSTRACT

A SIM for a mobile station used in a GSM mobile communications system the SIM operating system being adapted to perform data coding format conversion for data items stored in the SIM and transmitted to the mobile station. This ensures that the SIM is able to receive, and present, data items in the required standard format at the interface between the mobile station and the SIM, while allowing the data items to be stored in a compressed format in the SIM memory, thereby increasing the perceived storage capacity of the SIM.

20 Claims, 5 Drawing Sheets

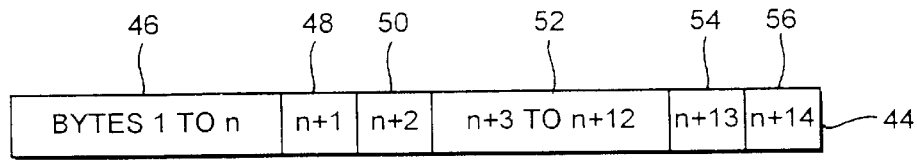
FIG. 4
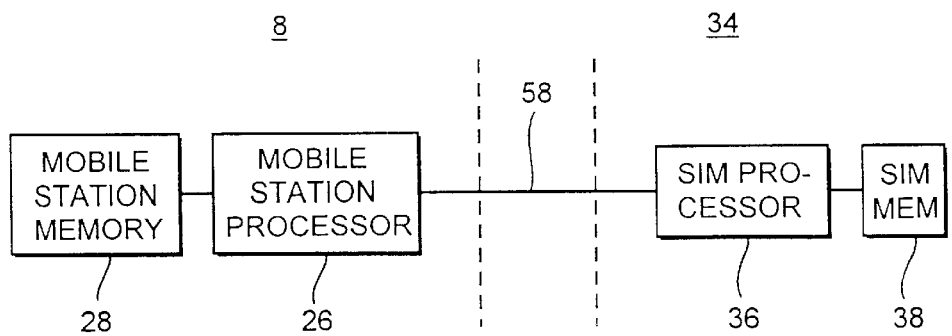
FIG. 5
FIG. 6

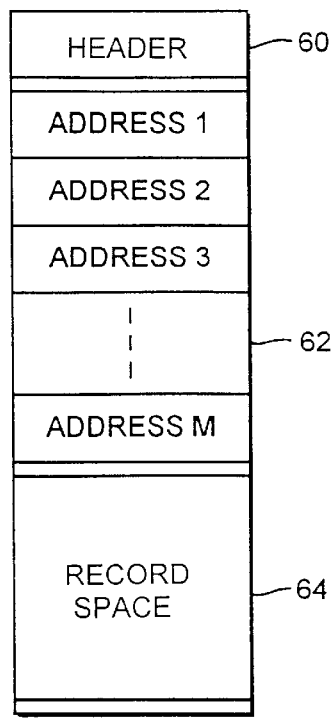
FIG. 7
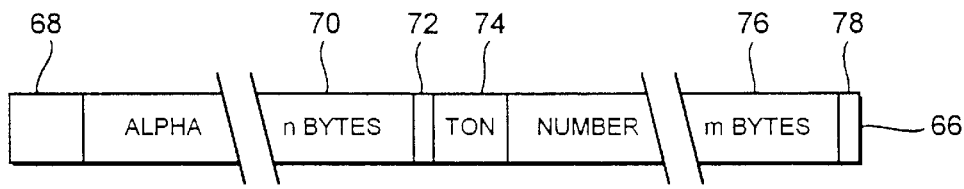
FIG. 8
| TYPICAL DIALLING NUMBERS: | CODED AS: |
|---|---|
| HOME<br>01234 567890 | XY 49 4F 4D 45 F 81 10 32 54 76 98 0 F |
| OFFICE<br>01234 987650 | WZ 4F 46 46 49 43 45 F 81 10 32 94 78 65 0 F |
| FRED MOBILE<br>0973 123456 | UV 46 52 45 44 20 4D 4F 42 49 4C 45 F 81 90 37 21 43 65 F |
FIG. 9

MOBILE COMMUNICATIONS TERMINAL SMART CARD

BACKGROUND OF THE INVENTION

This invention relates to a smart card for a user station used in a mobile communications system, such as a subscriber identity module (SIM) as used in a GSM (Global System for Mobile communications) digital cellular radio system, to a mobile station including such a smart card, and to a method of transmitting data items to and from such a smart card.

In a known conventional GSM system, each mobile station, such as a mobile telephone handset, is provided with a SIM, herein also referred to as a smart card, which is inserted into the mobile station in order to allow the mobile station to receive service in a GSM network.

A typical SIM includes a microprocessor, memory elements including a permanent memory (e.g. ROM), a non-volatile rewritable memory (e.g. EEPROM) and a volatile rewritable memory (e.g. RAM), and contacts for forming the data transfer interface between the SIM and the mobile station.

The GSM standard also specifies a command set for use by a mobile station to access data records in the SIM and retrieve and write data from and to the SIM. Such data records may be permanent data records, such as a record of the international mobile subscriber identity (IMSI) whereby the mobile subscriber is recognised by a mobile communications network.

Other data records are modifiable, either at the initiative of the mobile station (such as the data record holding the current location area information (LAI) for the mobile station) or at the initiative of the mobile subscriber (such as an abbreviated dialling number (ADN) record which is used to allow the subscriber to automatically initiate calling of the stored dialling number by selection of the associated dialling number identifier when displayed by the mobile station).

Other modifiable data records include a short message data record, which stores data relating to one or more short messages in alphanumeric characters received by the mobile station, for future retrieval by the subscriber.

For more details of the records which may be stored in a SIM, reference should be made to GSM Technical Specification 11.11 (ETS 300 608).

The memory capacity of the SIM is necessarily limited, primarily due to cost considerations.

Accordingly, the data records referred to above are limited in size and number in accordance with the memory capacity of the SIM, which can be a drawback. For example, in the case of ADN records, it is conventional to allocate sufficient memory capacity dedicated to an ADN list such that up to 90 ADN records can be provided. Some subscribers however require a greater ADN storage capacity. This is evidenced by the fact that ADN storage capacity is used as a positive marketing point by suppliers who are able to provide SIM's having relatively large ADN storage capacities. However, with a fixed amount of total memory capacity available, an increase in the memory capacity allocated to ADN records must be compensated for by a reduction in the memory capacity allocated to other data records.

Further information relating to known subscriber identity modules used in GSM may be found in Farrugia A J et Al.: "Smard Card Technology Applied to the Future European Cellular Telephone on the digital D-Network", selected papers from the Second International Smart Card 2000 Conference, Oct. 4–6 1989, Amsterdam, NL, 1991, pages 93–107.

GB-A-2251357 describes a radio telephone terminal which includes a terminal unit having a transmitter-receiver and an external device. The external device has a storage unit for storing subscriber information, a recaller unit for selectively recalling the stored information. Information may be recalled from the external device to the radio telephone unit, so that it is possible to originate a call from the terminal unit using a subscriber telephone number stored in the external device without the need for a dialling operation on the terminal unit. Thus, subscriber information stored in the terminal unit may be augmented by subscriber information stored in the external device.

U.S. Pat. No. 4,875,230 describes a cellular telephone which includes logic circuitry allowing keystroke sequences to be stored and recalled for activation using a short form recall command. It does not describe the use or a smart card.

BRIEF SUMMARY OF THE INVENTION

The present invention in one aspect provides a smart card for a mobile station used in a mobile communications system, said smart card including:

a memory for storing data items communicated via an interface between said card and said mobile station; and data item converting means, said converting means being for receiving a data item transmitted via said interface in a standardised data coding format, for converting said data items to a compressed data coding format and for storing said data item in said memory in said compressed data coding format, and said converting means being for receiving said data item from said memory in said compressed data coding format, for decompressing said data item to said standardised data coding format and for transmitting said data item via said interface in said standardised data coding format.

Thus, even if a standardised data coding format for a data item transmitted via the smart card/mobile station interface is not optimal for storage, by use of the present invention the data item can still be stored in the smart card in a compressed data coding format, without rendering the smart card incompatible with the chosen standard.

The data coding format conversion can be implemented invisibly to the mobile station. That is to say, the communication of data items via the interface between the smart card and the mobile station can be implemented in the data coding format required by the chosen standard, irrespective of the data coding format used for stored items.

Thus, the smart card can remain compatible with all mobile stations complying with the chosen standard.

In some cases, data items are required to conform to a standardised fixed length data coding format when communicated to or from the mobile station. The data item converting means then preferably converts data items from said fixed length data coding format to a variable length data coding format. More efficient data coding can thereby be achieved. For example, in the case of ADN records, the use of a variable length coding format for storage of ADN data items can increase the amount of ADN records available, compared to the conventional storage format, by over 50%. Thus, the number of ADN records available can be increased to over 100, without increasing the memory allocated to the ADN list.

The data items may comprise a variable Quantity of non-padding character data (i.e. data relating to useful information), and when in the standardised data coding format a variable quantity of padding data (i.e. data of which the contents are ignored). The data item converting means is preferably operable to reduce the amount of padding data when converting the data items to the different data coding format. Data items can then be stored in a more compact coding format in a given allocation of memory capacity.

In a further aspect, the invention provides a method of writing a data item to, and transmitting a data item from, a smart card for a mobile station used in a mobile communications system, said card including a memory for storing data items communicated via an interface between said card and said mobile station, wherein said method comprises:

receiving a data item transmitted via said interface in a standardised data coding format, converting said data items to a compressed data coding format and storing said data item in said memory in said compressed data coding format; and receiving said data item from said memory in said compressed data coding format, decompressing said data item to said standardised data coding format and transmitting said data item via said interface in said standardised data coding format.

BRIEF DESCRIPTION OF THE DRAWINGS

Embodiments of the present invention will now be described, by way of example only, with reference to the accompanying drawings in which:

FIG. 4 illustrates the structure of a fixed length data record;

FIG. 5 illustrates a standard coding of typical dialling numbers;

FIG. 6 illustrates a principle of the present invention;

FIG. 7 illustrates the structure of a data file according to the present invention;

FIG. 8 illustrates the structure of data record according to the present invention;

FIG. 9 illustrates the coding of typical dialling numbers according to the present invention;

DETAILED DESCRIPTION OF THE INVENTION

Figure 1:
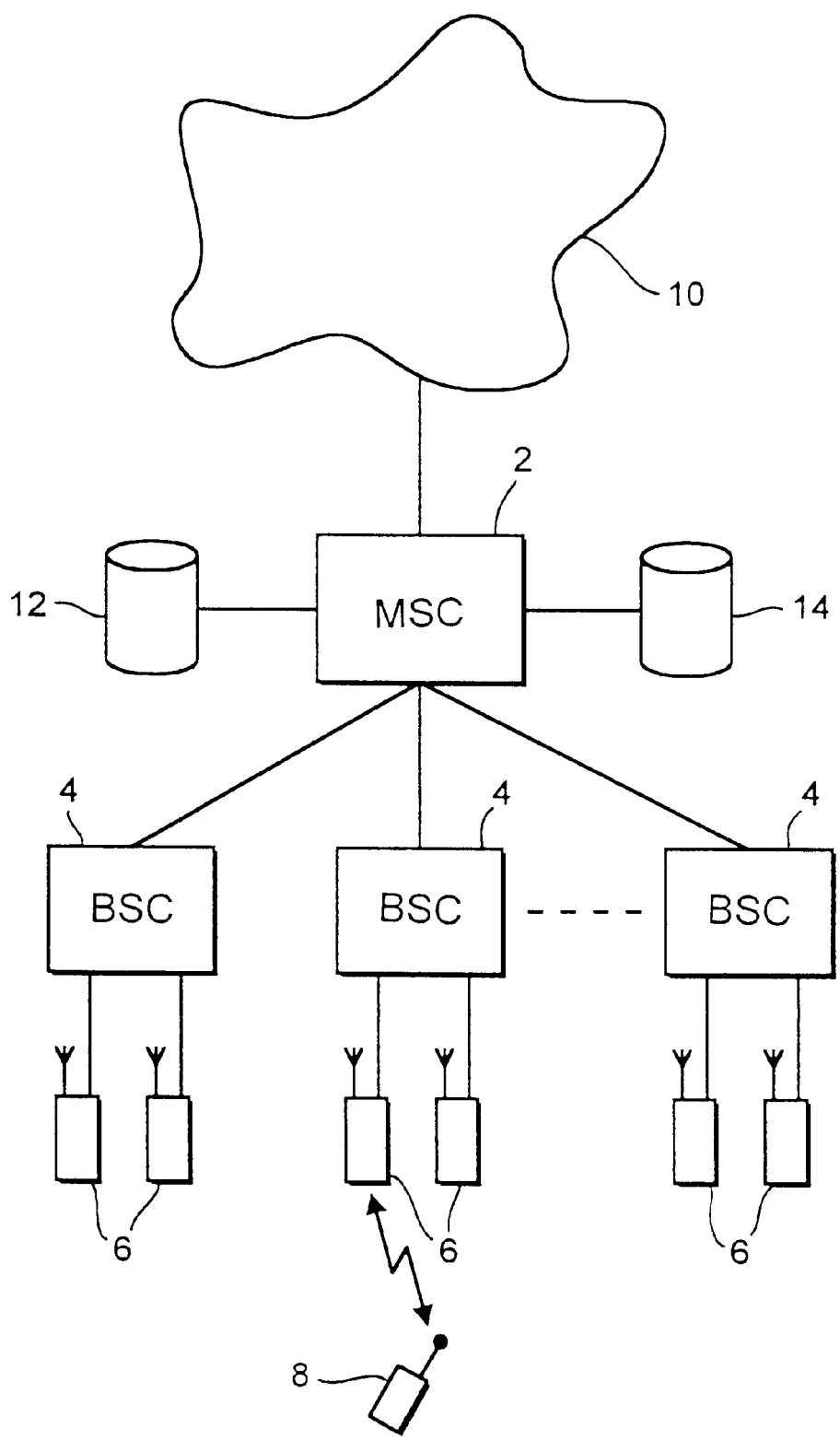
FIG. 1 is a block diagram of a mobile communications network.

A GSM network, referred to as a public land mobile network (PLMN), is schematically illustrated in FIG. 1. This is in itself known and will not be described in detail. A mobile switching centre (MSC) 2 is connected via communication links to a number of base station controller (BSCs) 4. The BSCs 4 are dispersed geographically across areas served by the mobile switching centre 2. Each BSC 4 controls one or more base transceiver stations (BTSs) 6 located remote from, and connected by further communication links to, the BSC. Each BTS 6 transmits radio signals to, and receives radio signals from, mobile stations 8 which are in an area served by that BTS. That area is referred to as a "cell". A GSM network is provided with a large number of such cells, which are ideally contiguous to provide continuous coverage over the whole network territory.

A mobile switching centre 2 is also connected via communications links to other mobile switching centres in the remainder of the mobile communications network 10, and to other networks such as a public service telephone network (PSTN), which is not illustrated. The mobile switching centre 2 is provided with a home location register (HLR) 12 which is a database storing subscriber authentication data including the international mobile subscriber identity (IMSI) which is unique to each mobile station 8. The IMSI is also stored in the mobile station in a subscriber identity module (SIM) along with other subscriber-specific information.

The mobile switching centre is also provided with a visitor location register (VLR) 14 which is a database temporarily storing subscriber authentication data for mobile stations active in its area.

Figure 2:
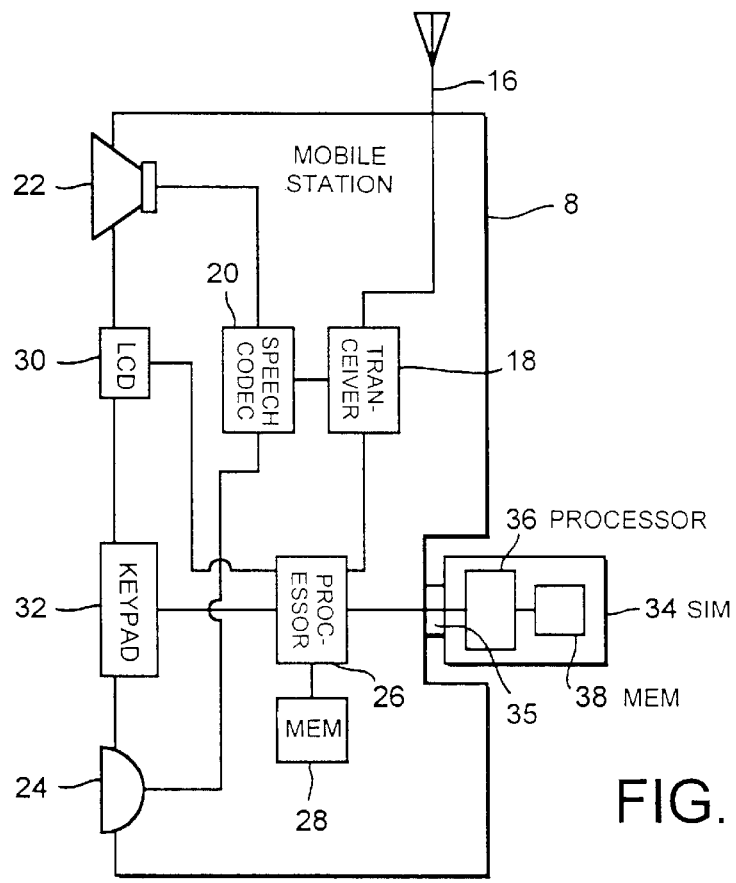
FIG. 2 is a block diagram of a mobile station.

Referring to FIG. 2, a mobile station 8 comprises a transmit/receive aerial 16, a radio frequency transceiver 18, a speech coder/decoder 20 connected to a loudspeaker 22 and a microphone 24, a processor circuit 26 and its associated memory 28, an LCD display 30 and a manual input port (keypad) 32. The mobile station is connected to a removable SIM 34 via electrical contacts 35.

The SIM 34 connected to the mobile station has a SIM processor 36, for example a Hitachi H8 microprocessor, and SIM memory 38, which includes for example 16 kilobytes of mask-programmed ROM 38a containing the SIM operating system, 8 kilobytes of read/write EEPROM 38b for the non-volatile storage of data items and 256 bytes of RAM for use by the SIM processor 36 during operations.

At present, two physical formats of SIM are specified by the GSM and ISO standards. The first is referred to as an ID-1 SIM, which is a removable smart card complying with the ISO 7816 standard and being of similar dimensions to that of a conventional credit card. The second is referred to as a plug-in SIN, which is a smart card of the same thickness as the ID-1 SIM, but only measuring 25 millimetres in length and 15 millimetres in width.

Both the mobile station 8 and the different formats of SIM 34 are well known and therefore need not be described in detail herein. A commercially-available SIM is the GemXplore (registered trade mark) SIM card produced by Gemplus, BP 100-13881, Gemenos Cedex-France.

As described above, the SIM 34 is used for the storage and retrieval of data items by the processor 26 of the mobile station 8. The command set, data file structure and data coding format for data communicated via the interface between the mobile station processor 26 and the SIM processor 36 are all specified, in the GSM system, in GSM technical specification 11.11.

Figure 3:
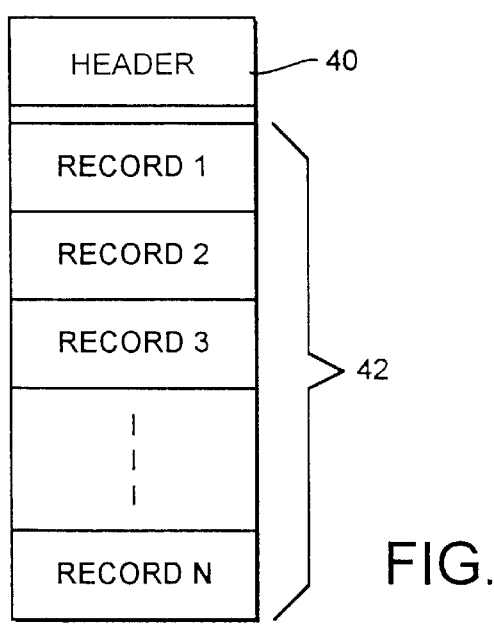
FIG. 3 illustrates the structure of a linear fixed data file.

A standard GSM file structure for the storage of data on a SIM, referred to as a linear fixed file structure, is illustrated in FIG. 3. It consists of a header 40 and record space 42. The record space is divided into N fixed length records.

One example of data record provided in the SIM memory 38 in a conventional SIM 34 is an abbreviated dialling number (ADN) record 44, which forms part of an ADN list file having a linear fixed file structure. Each ADN record 44 has data stored in a fixed length coding format. The record 44 is divided into fixed-length data blocks, each consisting of one or more bytes. A first data block 46, consisting of n bytes, is reserved for data relating to a dialling number identifier, such as a person's name, or a company name. A second block 48, consisting of one byte, is reserved for data indicating the length of the dialling number. A third block 50, consisting of one byte, is reserved for data indicating the type of dialling number stored in the record. A fourth block 52, consisting of 8 bytes of memory, is reserved for the dialling number data itself, coded in extended BCD coding as defined in GSM Technical Specification 11.11. A fifth block 54, consisting of one byte, is reserved for a "capability configuration pointer", indicating the bearer services (e.g. voice call, fax, etc.) which can be supported by the telephone equipment corresponding to the dialling number stored. A final data block 56, consisting of one byte, is an extension record pointer, which indicates the address of an extension record to be accessed in a different data file to give the remainder of a dialling number. The extension record pointer is used only in the rare case that the dialling number is longer than can be stored in the allocated data block 52.

Referring to FIG. 5, data items relating to three typical dialling numbers and their associated dialling number identifier are shown coded in the standardised format. Each nibble (four bits of data) is indicated in hexadecimal notation. It will be seen that the coded data consists not only of useful character data, but also of padding data (in this case hexadecimal "F"s) which is added to fill unused memory space in the fixed-length record. Thus, for the dialling number identifier "home", 4 bytes are used for coding the character data, whereas in this case 10 bytes are available. The remaining 8 bytes are filled with padding data. The length of number indicator ("07") is coded in one byte, and the type of number code ("81") is coded in the next byte. The dialling number itself is stored in a nibble-swapped coding format, that is to say that, in each byte, the nibbles are coded in reverse order. The character data corresponding to the dialling number "01234 567890", occupies 5½ bytes, and 4½ bytes of the data block 52 are filled with padding data. As is generally the case, no extension record data or capability configuration pointer data is available. The last two data blocks 54 and 56 are therefore also filled with padding data.

The principle of this embodiment of the present invention is illustrated in FIG. 6. In accordance with this embodiment of the invention, a standardised data coding format need only be used selectively in communications between the mobile station 8 and the SIM 34. Data is transmitted between the SIM processor 36 and the SIM memory 38 in a different data coding format to that used across the communications interface 58 between the SIM processor 36 and the mobile station processor 26.

In the case of the present embodiment, the operating system stored in the ROM of the SIM processor 36 is adapted to compress and decompress data communicated between the SIM memory 38 and the interface 58. That is to say, the data coding format used in records provided in the SIM memory 38 is not the same as that used when those data records are communicated across the interface 58 to and from the mobile station processor 26.

This allows a more compact data coding format to be implemented in the SIM memory 38, whilst the SIM itself conforms with a prescribed GSM standard.

Referring now to FIG. 7, a new file structure is provided for variable-length data records in the SIM. This file structure includes a header portion 60, a directory list 62 and record space 64. The header 60 consists of 2 bytes of data, the first indicating the average length of records in the record space 64 and the second indicating the number of valid records in that space. The directory list 62 is divided into N blocks which provide storage space for addresses, or offset address values, for up to N data records in record space 64. The record space 64 contains the variable length ADN data records.

A data coding format for an ADN data item when stored in record space 64 is shown in FIG. 8. The ADN record 66 consists of various data blocks. A first fixed length data block 68, consisting of one byte, has individual bits allocated for various information. One bit is reserved for an extension record flag, a second is reserved for a capability configuration flag, a third bit is available for storage of other information, and five bits are allocated for indicating the byte length of the record. A second, variable length, data block 70 consists of n bytes, containing the dialling number identifier data. Each of these bytes is filled with non-padding character data, for example the name of the party to be called, coded in the 7-bit coded alphabet as defined in GSM Technical Specification 03.38, with the eighth bit of each byte set to zero. The length of the data block 70 corresponds with the length of the dialling number identifier.

A third data block 72 consists of one nibble with each of its bits set to "one", i.e. hexadecimal "F", to indicate the end of the dialling number identifier. A fourth, fixed length, data block 74, consisting of one byte, is reserved for storing data relating to the type of dialling number stored in the record. A fifth, variable length, data block 76 is reserved for storage of message data, coded in the GSM extended BCD coding number set representing the dialling number. The length of the data block 76 corresponds with the amount of digits in the dialling number. A final data block 78, consisting of one nibble having each bit set to "one", is an end marker indicating the end of the record.

FIG. 9 illustrates the same ADN data as was illustrated in FIG. 5, coded according to the compressed data coding format. The first byte of each ADN data item, indicated as "XY", "WZ" and "UW" in each respective case, represents the new data created in data block 68. The remainder of each data item is the restructured character data relating to the dialling number identifier, the type of number identifier, and the dialling number itself. As can be seen, unnecessary padding data is eliminated in the compressed data coding format. The only hexadecimal "F"s present are those used either for coding the alphabetical characters or are those used as end of data block markers. It will be apparent from FIG. 9, when compared with FIG. 5, that the data items when in the compressed data coding format occupy significantly less memory space than when in the standardised coding format.

The SIM operating system, implemented by the SIM processor 36, performs conversion between the compressed data coding format and the standardised data coding format when writing data to the SIM memory 38 and when retrieving data from the SIM memory 38. This ensures that the data items communicated via the interface 58 to or from the mobile station 8 are presented in the standardised data coding format, as required by the GSM standard.

If all data items occupied the allocated space in the fixed-length coding format, no discernable data compaction would be obtained by implementing the data coding format conversion method of the present invention. However, in practice since the standardised format is defined so that the SIM is capable of accommodating relatively long dialling numbers, the majority of dialling numbers, and often also the dialling number identifiers, are shorter than the maximum length provided for. A significant amount of data compaction can therefore be achieved.

Figure 10:
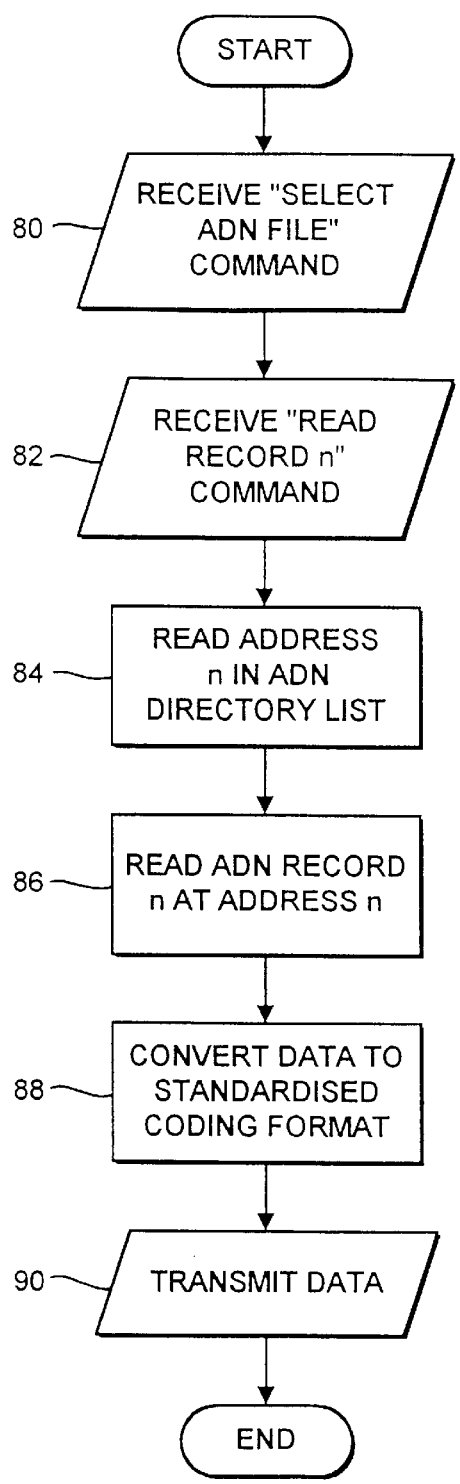
FIG. 10 is a flow diagram showing a procedure followed by the SIM of a mobile station when reading an ADN record in accordance with the present invention.

Referring now to FIG. 10, in order to access an ADN data record, the mobile station processor 26 generates a "SELECT FILE" command selecting the ADN list file, which is received by the SIM processor 36 at step 80. Next, the processor 26 generates a "READ RECORD" command, received by the SIM processor 36 at step 82, specifying that record number n in the data file is to be read. These commands are specified in GSM technical specification 11.11. A conventional SIM card would respond by reading record n in the linear fixed file and transparently transmitting the record contents to the processor 26.

According to this embodiment of the present invention, the SIM processor, controlled by its operating system, first accesses the directory list 62 to identify the address of record n in the record space 64, step 84, and then reads the data beginning from that address in the record space 64, step 86, the length of the record being indicated by the length data stored in the first block 68 of the record.

The SIM processor 36 then decompresses the record contents by converting from the compressed data coding format to the standardised data coding format, adding the padding data where required to produce a data item of a fixed length, step 88. This is then transmitted across the interface 58 to the mobile station processor 26, step 90. The mobile station processor 26 then copies this data item to its associated memory 28, where it is stored temporarily for retrieval whilst the mobile station remains switched on.

Figure 11:
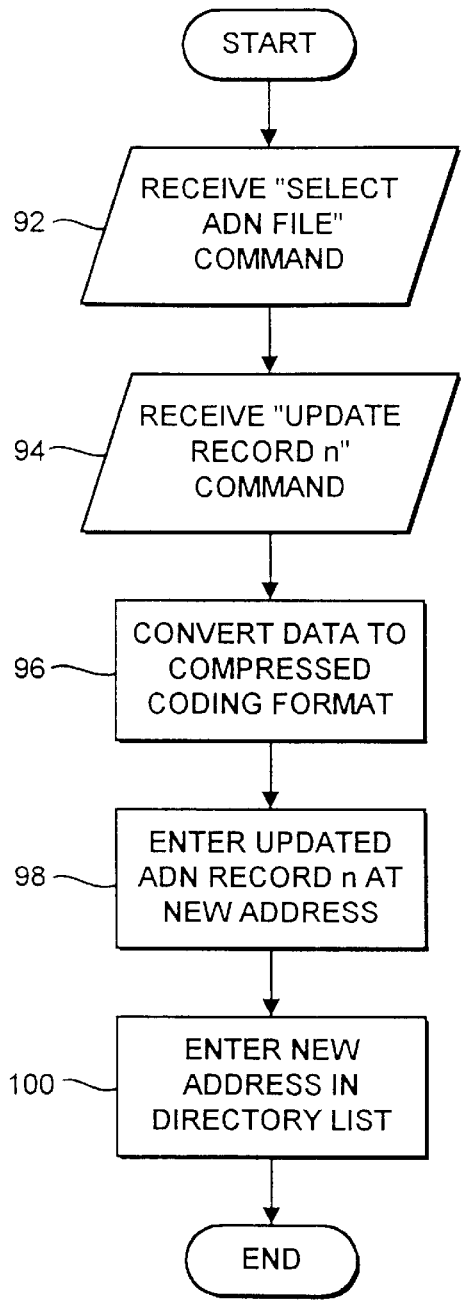
FIG. 11 is a flow diagram showing a procedure followed by the SIM of a mobile station when updating an ADN record in accordance with the present invention.

Reference is now made to FIG. 11. When the mobile station processor 26 wishes to write an ADN data item to the SIM 34, it generates a "SELECT FILE" command selecting the ADN list file, received by the SIM processor 36 at step 92. Next, the processor 26 sends the data item in the standardised data coding format across interface 58 to the SIM processor 36 with an "UPDATE RECORD n" command, received by the SIM processor 36 at step 94. The SIM processor then compresses the data by converting the data into the compressed data coding format, step 96, and stores the compressed data item in a newly created record at the end of the current records in the record space 64, step 98. The SIM operating system then makes a corresponding entry in the directory list 62, step 100.

When data records are consecutively entered in the record space 64, the records are contiguous. However, when a data record is deleted, or updated, the memory space previously occupied by that data record is filed with padding data (hexadecimal "F"s). In the case of a record being updated with new data, a new record is created and stored at the end of the current records, since it cannot be guaranteed that the record will be the same length once updated. Thus, when records are deleted or updated, the record space 64 will become fragmented. In order to overcome this, the card operating system periodically de-fragments the records in the record space 64, by reading a data record adjacent an empty space (filled with padding data) in the record space 64 into a buffer memory space and rewriting the record at least partially into the empty record space, contiguous with the adjacent record.

If de-fragmentation were implemented immediately after updating or deletion of a record, there would be a danger that the SIM could be switched off, in response to a command from the mobile station 8, during de-fragmentation, in which case it is possible that the data record contents could be lost. In this embodiment of the invention, the SIM operating system performs de-fragmentation in steps in response to a command (which is intended to perform a different function) periodically sent to the SIM by the mobile station 8, such as a reset command.

A reset command is sent when the mobile station 8 is first switched on, and various initialisation steps are performed by the SIM processor 36 on receipt of a reset command. Since the ADN list update frequency is assumed to be relatively low, it is not necessary to de-fragment the entire ADN list at each reset.

Instead, de-fragmentation is performed gradually and a limited number of records, for example, 2 or 3, are de-fragmented per reset command. That is to say, 2 or 3 records are displaced in the record space 64 to occupy the space of a previously deleted or displaced record each time the SIM is reset. By this method, any delays experienced by the mobile station user, caused by de-fragmentation of the ADN list before the SIM is initialised, can be reduced.

The SIM includes a counter data record, incremented at each reset command, which indicates the present record number up to which de-fragmentation has been completed. The SIM processor 36 reads the volume of this counter data record at each reset command to determine which records are next to be de-fragmented. Thus, for a heavily fragmented record space 64, a large block of available memory space is created as the records are gradually compacted together by de-fragmentation. Once de-fragmentation is completed, for all current records the SIM operating system resets the counter value and further de-fragmentation of the ADN list, if required, begins afresh at the first record in the record space when the SIM is again reset.

Other Embodiments

The data described has thus far been ADN data. However, it will be appreciated that the present invention can be applied to any other types of data required to be transmitted across the mobile station/removable data store interface according to the relevant standard in non-optimum data coding formats.

In the GSM standard, other data is transmitted between the mobile station and the SIM in a fixed length coding format similar to that of the ADN data, for which the present invention is therefore similarly applicable. Such other data includes fixed dialling number (FDN) data, mobile subscriber directory number (MSISDN) data, extension record data, etc.

Furthermore, although in the above embodiment a compression/decompression method implemented by stripping padding data from, and replacing padding data in, data items is used, alternative, or additional, data coding format conversion methods are envisaged. Apart from the wasted memory space associated with padding data, many dialling numbers contain frequently repeated dialling codes. For example, the dialling code for mobile stations subscribing to a particular mobile communications network may have a dialling code of "0973". Replacing this code with a token code of shorter length could be implemented by the SIM operating system before storage of the dialling number in the SIM memory, with replacement of the code in its full length being implemented when the dialling number is retrieved from the SIM memory by the SIM operating system.

It is to be noted that the data format conversion need not necessarily be performed in the SIM. For example, a mobile station can be implemented which transmits (or receives) data items across the SIM/mobile station interface both in a standardised data coding format (such that the mobile station remains compatible with conventional SIMs, and therefore conforms to a standard), and in a compressed data coding format, such that a SIM in accordance with the present invention can store the data items received in the compressed data coding format, and disregard the standardised data coding format items.

Although the above description has related to a SIM used in a GSM-compatible mobile station, it should be appreciated that the present invention is applicable to equivalent forms smart card used in any other mobile communication system. References to GSM include other standards for which at least some features, in particular with regard to the mobile station/SIM interface, are set by the GSM technical specifications, such as the PCN standard and the DCS 1800 standard.

Other variations, improvements and modifications are also envisaged to fall within the scope of the present invention.

What is claimed is:

1. A smart card for a mobile station, having a first data processor, utilized in a mobile communications system, the smart card comprising:

an interface capable of transferring data items from and to the mobile station;

a memory capable of storing the data items; and a second data processor interacting with the first data processor by receiving data items therefrom, and transmitting data items thereto, in a predetermined coding format, such that the smart card is compatible with different mobile stations implementing a common mobile station/smart card interfacing standard, and storing and retrieving the data items to and from the memory, wherein the second processor is adapted to convert a data item received via the interface from the predetermined coding format to a compressed coding format and to store the data item in the memory in the compressed coding format, and wherein the second processor is adapted to convert the data item, when retrieved from the memory, from the compressed coding format to the predetermined coding format before transmitting the data item via the interface in the predetermined coding format, wherein the compression and decompression is performed on the smart card to reduce the amount of memory occupied by the data item on the smart card, without diverging from the mobile station/smart card interfacing standard.

2. The smart card according to claim 1, wherein the predetermined coding format comprises a fixed length coding format and the compressed coding format comprises a variable length coding format.

3. The smart card according to claim 2, wherein the data items comprise a variable amount of non-padding character data when in the fixed length coding format.

4. The smart card according to claim 3, wherein the data items have lengths varying in increments of one character when in the variable length coding format.

5. The smart card according to claim 1, wherein the data item comprises data representing alphanumeric characters.

6. The smart card according to claim 5, wherein the data item comprises data representing a dialing number and/or a dialing number identifier.

7. The smart card according to claim 1, wherein the data item comprises information input by a user for subsequent retrieval.

8. The smart card according to claim 1, wherein the data item comprises padding data when in the predetermined coding format, and wherein the second processor reduces the amount of padding data when converting to the compressed data coding format.

9. The smart card according to claim 1, wherein the data item is stored in one of a plurality of data records in an allocated data file in the memory, the data file having an associated directory file storing an address for each data record, wherein the second processor is adapted to delete a data record from the data file and to (i) displace another data record to occupy memory space previously occupied by the deleted record, and (ii) update the directory file, and wherein the second processor is adapted to perform (i) and (ii) in response to a command sent by the mobile station subsequent to the deletion.

10. The smart card according to claim 9, wherein the command comprises a reset command.

11. The smart card according to claim 1, wherein the smart card comprises a Global System for Mobile communications (GSM)-type subscriber identity module.

12. The smart card according to claim 1, wherein the smart card communicates data with a mobile station in a mobile communications system.

13. The smart card according to claim 1, wherein the standard comprises a Global System for Mobile communications (GSM) standard.

14. A method of storing and retrieving a data item using a smart card communicating with a mobile station of a mobile communications system via an interface, the smart card and the mobile station each conforming with an identical mobile station/smart card interfacing standard defining a predetermined format of data coding for a data item when transmitted across the interface, the method comprising:

(a) processing the data item in the mobile station to ensure the data item is in the predetermined format;

(b) transmitting the data item in the predetermined format to the smart card via the interface;

(c) processing the data item in the smart card, to compress the data item to a compressed coding format;

(d) storing the data item in a memory in the smart card using the compressed coding format;

(e) retrieving the data item from the memory;

(f) processing the data item in the smart card to decompress the data item from the compressed coding format to the predetermined coding format, the compression and decompression being performed on the smart card to reduce the amount of memory occupied by the data item on the smart card, without diverging from the mobile station/smart card interfacing standard; and (g) transmitting the data item in the predetermined format from the smart card to the mobile station.

15. The method according to claim 14, wherein the predetermined coding format comprises a fixed length coding format and the compressed coding format comprises a variable length coding format.

16. The method according to claim 14, wherein the data item comprises a dialing number and/or a dialing number identifier.

17. A smart card for a mobile station, having a first data processor, used in a mobile communications system, the smart card comprising:

an interface capable of transferring data items from and to the mobile station;

a memory capable of storing the data items; and a second data processor capable of interacting with the first data processor by receiving the data items therefrom, and transmitting data items thereto, such that the card is compatible with different mobile stations implementing a common mobile station/smart card interfacing standard, and storing and retrieving the data items to and from the memory, wherein the data items are stored in a plurality of data records in an allocated data file in the memory, the data file having an associated directory file storing an address for each data record, the second processor being adapted to delete a data record from the data file and to (i) displace another data record to occupy space in the memory previously occupied by the deleted record, and (ii) update the directory file, and wherein the second processor is adapted to perform (i) and (ii) in response to a command sent by the mobile station subsequent to the deletion.

18. The smart card according to claim 17, wherein the command comprises a reset command.

19. A method of storing and retrieving a data item using a smart card communicating with a mobile station of a mobile communications system via an interface, the smart card and the mobile station each conforming with a predetermined mobile station/smart card interfacing standard defining a predetermined format of data coding for a data item when transmitted across the interface, the method comprising:

(a) processing the data item in the mobile station to ensure the data item is in the predetermined format;

(b) transmitting the data item in the predetermined format to the smart card via the interface;

(c) processing the data item in the smart card to compress the data item to a compressed coding format; and (d) storing the data item in a memory in the smart card in the compressed coding format.

20. The method according to claim 19, additionally comprising:

retrieving the data item from the memory, wherein retrieving the data item comprises processing the data item in the smart card to decompress the data item from the compressed coding format to the predetermined coding format, and wherein the compression and decompression performed in the smart card reduces the amount of memory occupied by the data item on the smart card, without diverging from the mobile station/smart card interfacing standard; and transmitting the data item in the predetermined format from the smart card to the mobile station.

* * * * *